Feb. 7, 1933.   S. RUBEN   1,896,101
ELECTRIC CURRENT RECTIFIER
Original Filed June 22, 1925
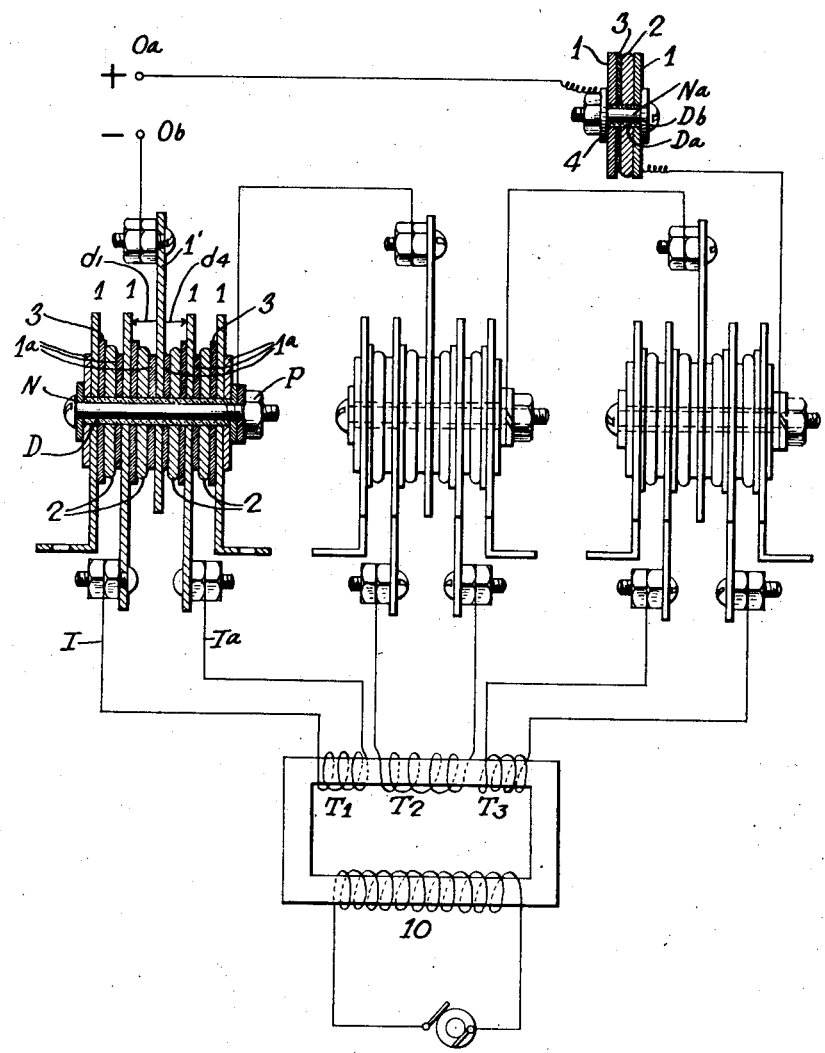
INVENTOR.
Samuel Ruben
BY
Mayer, Warfield & Watson
ATTORNEYS.

Patented Feb. 7, 1933

1,896,101

UNITED STATES PATENT OFFICE

SAMUEL RUBEN, OF NEW YORK, N. Y., ASSIGNOR TO RUBEN RECTIFIER CORPORATION, OF ENGLEWOOD, NEW JERSEY, A CORPORATION OF DELAWARE

ELECTRIC CURRENT RECTIFIER

Original application filed June 22, 1925, Serial No. 38,780. Divided and this application filed January 12, 1928. Serial No. 246,256.

This invention relates to electric current rectifiers, and more particularly to electric current rectifiers of the dry surface-contact type which operate by unilateral conduction.

Rectifiers of this type are characterized by the use of a body of relatively electropositive material, employed as one electrode element, disposed in electrical contact with a body of relatively electronegative material employed as the other electrode element. Such rectifiers depend for their operation upon the resistance and current-blocking characteristics of the film which forms at the junction of the electrode elements as the result of electrochemical action. Rectifiers of this character, known prior to my inventions, have been low in efficiency and limited in their application to small currents, becoming unstable after short periods of use.

This invention has for its object generally the provision of a rectifying device of this character which is efficient, economical and readily manufactured.

More specifically its object is to provide a rectifier of the dry surface-contact variety in which the factors heretofore operating to dissipate or entirely nullify the rectifying effect in such rectifying devices, are so balanced and compensated that a uniform rectifying action may be had substantially indefinitely without cessation or diminution.

Another object is to provide a device of this character, which is capable of complete double wave rectification, and is also constructed to withstand imposed electrical and mechanical stresses.

Other objects of the invention will in part be obvious and will in part appear hereinafter.

This application is a division of my application, Serial No. 38,780, filed June 22, 1925, issued as Patent No. 1,723,525, which application is a continuation in part of my prior applications No. 739,188 filed September 22, 1924, issued as Patent 1,649,741; No. 750,539 filed November 18, 1924, issued as Patent No. 1,649,742; No. 754,956 filed December 10, 1924, issued as Patent No. 1,865,213; No. 155 filed January 2, 1925, issued as Patent No. 1,649,743; No. 13,143 filed March 5, 1925, issued as Patent 1,649,744; No. 14,657 filed March 11, 1925, issued as Patent No. 1,779,188.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention reference should be had to the following detailed description taken in connection with the accompanying drawing, in which:

The figure is an exemplary view showing, mainly diagrammatically, a rectifying device constructed in accordance with the invention.

The rectifying device here shown is composed of a plurality of asymmetric electric couples, each consisting of a pair of electrode elements, which are mechanically retained between highly conducting elements, for example the copper plates shown at 1 and 1$^a$. These electrode elements are of relatively highly electropositive and electronegative materials and are shown at 2 and 3 respectively; 2 denoting a body of suitable electronegative material, for example a copper compound, such as cupric sulphide; 3 denoting a body of highly electropositive material, for example of relatively highly electropositive metal or metallic compound, such as aluminum or zinc, aluminum amalgam, or a body coated with an oxide as hereinafter further explained. These elements are relatively smooth so as to have materially extended areas adapted for operative contact, and are held in assembled relation by means of the insulated bolt N and nut P, the insulating tube shown at D serving to insulate the bolt from the electrode elements but does not insulate the bolt from the end plates.

For rectifying purposes, the asymmetric couples thus provided are formed into units comprising a series of couples. For full wave rectification these units as indicated preferably comprise two groups of series inverted with respect to each other, the groups containing an equal number of asymmetric couples. In this form of device the input terminals are with advantage inserted at intermediate points of each group, for example midway, as shown at I and I$^a$, respectively. The end plates of the groups serve as suitable output terminals. The plate 1' between the two groups in each unit is shown in contact with electropositive elements 3 and is adapted to be connected to the negative terminal of a current-consuming device, here indicated O$_b$.

In the practice of the invention, it has been observed that the primary cause of the deterioration and destruction of the rectifiers of this type is the force of the intense electric field at the junction of the electrode elements; even at low voltages these forces physically shatter the rectifying film, composed probably in the present instance of a metallic sulphide. It developed, however, that it is possible to overcome the dynamic effect of those forces by the application of physical pressure and only when over that area there is a layer of a material of specific resistance higher than that of either element. This offers substantially the only method by which the rectifying action may be continued without surface deterioration of the two contacting elements.

Thus, there are two fundamental factors to be supplied: (first) there should be between the rectifying elements a layer of material having a specific resistance higher than that of either element; and (second) there should be a surface pressure retaining the rectifying elements sufficient to overcome the dynamic effect of the electric field at the junction when passing current.

Accordingly in rectifying devices of the character specified, in which the contacting elements are, for example, aluminum and cupric sulphide, or zinc and cupric sulphide having an intense electric field at the junction of the electrode elements, the capacity for current rectification diminishes with the development of a surface reaction product of a relatively non-conductive layer of aluminum (or zinc) and copper oxides, which ultimately reduces the output to a zero value; this effect increases with both the potential impressed and the current density of the current passing, and particularly with the latter. Provision is made for avoiding this destructive effect by applying to the contacting elements a pressure so great as to prevent any movement of the surface particles, at the same time effecting a better and more uniform distribution of current and therefore of temperature over the contacting areas. Excessive pressure, however, defeats the purpose and prevents the rectifying action because the specific resistance of the contacting members is so low that the contact drop of potential is insufficient to allow an asymmetrical conductive effect due to the formation and maintenance of a current-blocking film at the junction. This lack of a proper drop of potential is overcome by a proper drop of potential is overcome a layer of resistance material other than an inverse current-blocking film, this resistance layer being a compound having a higher specific resistance than that of either element, preferably a compound of the electropositive material. By the use of this interposed layer of resistance material the pressure can then be carried practically to the limit of the compression strength of the weaker element without affecting the rectification characteristics of the couple. However, the interposed layer of resistance material must not be so thick as to offer too high a resistance and a resultant excessive resistance drop of potential.

In order to obtain a proper drop of potential between the electrode elements, a thin layer of the material having a specific resistance higher than either of the electrode elements may be applied as a thin coating on either of them; this coating material may be, for example, iron sulphide, silver sulphide, or an oxy- compound of one of the electrode elements, particularly a surface oxide or hydroxide coating. The latter are preferable, but when employed, care should be taken that the layer be very thin and that it be uniformly applied so as to insure a relatively even current distribution over the entire contacting area.

A method preferred for assembling electrode elements of a rectifying couple which provides between the electrode elements a proper layer of resistance material other than an inverse current-blocking film, consists in disposing adjacently the electropositive body and the electronegative body, placing a thin film of water therebetween, and then applying an alternating current at the normal operating potential to electrolytically decompose the water, causing the formation of a layer of resistance material of an oxide upon the electrode surface. During the formation period mechanical pressure is maintained close to the limit of the compression strength of the weaker element, the pressure being increased according to the varying input current, which is indicative of the formation of the oxide coating. The pressure is increased only as the inverse and leakage current are indicated to be at a minimum. When the couple has been formed, only negligible current flows to it as no load is applied. At this stage, the couple is heated, preferably externally and an alternating current applied until all the excess water is driven off. Although alternating current is preferred direct current may be used in the formation of the layer of resistance material. However, by the use of alternating current more heat or a higher temperature is insured for the decomposition of the film of water. In addition the use of alternating current insures against the presence of undesirable electrolysis action.

In certain devices of the prior art it was necessary to effect a sparking at the surface of the electrode elements by passing a current of high density across the junction of the electrode elements to effect formation of an inverse current-blocking film. By the present invention such sparking is unnecessary and there is no physical consumption of the electrode material such as occurred in the methods employed in the prior art. After the electrode elements have been assembled with the interposed layer of resistance material an inverse current-blocking film is formed as a reaction product between the electronegative electrode element and the layer of resistance material upon the passage of current, metallic ions from the electropositive electrode, which either pass through or are supplied from the compound constituting the layer of resistance material, apparently reacting with sulphur ions believed to be loosed from the electronegative element by the passage of inverse current to form the inverse current-blocking film. This explanation is advanced only as a theory since it is not certain that such action takes place but the results, i. e., rectification, obtained by the use of the device of the present invention herein described and claimed are efficient and certain and it is not desired to restrict the present invention to any particular theory.

Asymmetric couples of the character provided by the present invention may have voltages continuously impressed thereacross up to a working maximum of approximately 5 volts. Current densities may be employed up to a working maximum of 1 ampere per square centimeter of contacting area. For higher voltages the couples would of course be connected in series. For voltage requiring a large number of couples, the series arrangement is not practical, due to the uneven distribution of potential across the couples which results. The distribution of potential, though it be initially uniform, soon becomes more concentrated across one couple than another in the series, so that arcing occurs. This latter is due apparently to the puncturing of the rectifying film which is electrochemically formed at the junction of the electrode elements; the rectifying device in consequence breaks down and becomes inoperative.

To apply current of potentials higher than a single rectifying unit is adapted to withstand, the arrangement of electrical connection illustrated is preferably employed. Here a plurality of rectifying units are connected so that their output terminals are in series and their input terminals connected with suitable independent sources of alternating current. This is accomplished preferably by the use of a transformer having a separate secondary for each separate rectifying unit to which it is connected. In the drawing there is accordingly shown a transformer 10, having its secondary divided into three parts, namely, $T_1$, $T_2$ and $T_3$, which are respectively connected across the input terminals I and $I^a$ of each of three series connected rectifying units.

It has been ascertained that when the rectifying units operate under a considerable voltage stress, for example when the voltage of the current-consuming device may exceed that of the rectifying device, a noticeable transitory deterioration in the units will take place. To prevent such deterioration and avoid the stress, there is connected in series with the output circuit, an inverse current cut-out; in the preferred form this cut-out consists of an asymmetric couple of this invention. Such a cut-out will function to block substantially the discharge from a current-consuming device, such as a storage battery in the output circuit, back to the rectifier, in case the alternating current supply is accidentally interrupted. In the drawing the output circuit shows a cut-out of this character connected in series with the three rectifier units. The cut-out shown comprises contact plates 1, between which are disposed a cupric sulphide plate 2 and an aluminum plate 3 of the character indicated above. The elements are maintained under pressure by bolt $N_a$ insulated by dielectric tube $D_a$ and washer $D_b$ from the other elements except at conducting washer 4.

The cupric sulphide electrode elements here employed are preferably produced by heating copper plates in a non-oxidizing atmosphere charged with sulphur vapor under pressure, to about 800 degrees C. and then reheating them to about the same temperature in air, which heat drives off much of the free sulphur, and plunging them into a chilling bath, preferably water, when a hardening and recrystallization takes place. Recrystallized cupric sulphide elements withstand the stresses of current discharge better than those not so treated.

In operation, when alternating current is applied respectively across the input electrodes I and $I_a$, current flows in the output circuit only when the aluminum amalgam element is a cathode, i. e. in the direction indicated by arrows $d_1$ and $d_4$; direct current thereupon flowing through the series of rectifying devices, to the output circuit and thence to the terminals $O_a$ and $O_b$. Upon a reversal of polarity on the input side, the direction of flow shown by the arrows $d_1$ and $d_4$ would be reversed.

For the arrangement shown, it will be seen that the resultant secondary voltage from the transformer 10 is distributed in substantially equal portions across the respective input terminals. The output terminals in consequence of this arrangement have a potential which substantially represents the sum of the total portions of input voltage.

The out-put direct current discharges through the cut-out member which blocks any inverse current, thereby relieving the rectifying unit from the stress of any discharges from such a source as a storage battery when its potential is higher than that of the rectifier unit, and particularly when the charging current is interrupted.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In dry surface-contact rectifying devices and the like, in combination, an electronegative electrode element of a compound of a relatively highly electronegative chemical element with a metal, an electropositive electrode element of a metal removed at least two groups in the electropositive direction in the electrochemical series from said electronegative chemical element, said electrode elements being adjacently disposed for asymmetric conduction, a layer of resistance material other than the inverse current blocking film interposed at the junction of said electrode elements having a specific resistance higher than that of either of said electrode elements, said layer of resistance material comprising a compound of the electropositive electrode element formed by the decomposition of water between said electrode elements while the latter are maintained under high pressure, and means for holding said elements in assembled relation under pressure sufficient to withstand the destructive effects of the electrical field at said junction when passing current, whereby substantial constancy of current output is insured.

2. In dry surface-contact rectifying devices and the like, the combination comprising an electronegative electrode element of a sulphur compound with a metal, an electropositive electrode element of a metal removed at least two groups in the electropositive direction in the electrochemical series from the chemical element sulphur, said electrode elements being adjacently disposed for asymmetric conduction, a layer of resistance material other than the inverse current blocking film interposed at the junction of said electrode elements having a specific resistance higher than that of either of said electrode elements, said layer of resistance material comprising a compound of the electropositive electrode element formed by the decomposition of water between said electrode elements while the latter are maintained under high pressure, and means for holding said elements in assembled relation under pressure sufficient to withstand the destructive effects of the electrical field at said junction when passing current, whereby substantial constancy of current output is insured.

3. In dry surface-contact rectifying devices and the like, the combination comprising an electronegative electrode of a sulphur compound with copper, an electropositive electrode of a metal removed at least two groups in the electropositive direction in the electrochemical series from the chemical element sulphur, said electrode being adjacently disposed for asymmetric conduction, a layer of resistance material other than the inverse current blocking film interposed between the junction surfaces of said electrode elements having a specific resistance higher than that of either of said electrode elements, said layer of resistance material comprising a compound of the electropositive electrode element formed by the decomposition of water between said electrode elements while the latter are maintained under high pressure, and means for holding said electrode elements in assembled relation under pressure sufficient to effect substantial constancy of current output when passing current.

4. In dry surface-contact rectifying devices and the like, the combination comprising an electronegative electrode of a sulphur compound with a metal, an electropositive electrode of a metal removed at least two groups in the electropositive direction in the electrochemical series from the chemical element sulphur, said electrode elements being adjacently disposed for asymmetric conduction, a layer of resistance material other than the inverse current blocking film containing an oxide compound of an electrode element interposed at the junction of said electrode elements, said layer of resistance material being formed by the decomposition of a film of water between said electrode elements while the latter are maintained under pressure close to the compression strength of the weaker element, and adapted to produce a material drop of potential between said electrode elements, and means for holding said electrode elements in assembled relation under pressure sufficient to maintain a condition for substantial constancy of current output.

5. In dry surface contact rectifying devices and the like, the combination comprising an electronegative electrode element of a sulphur compound with copper, an electropositive electrode element of a metal removed at least two groups in the electropositive direction in the electrochemical series from the chemical element sulphur, said electrode elements being adjacently disposed for asymmetric conduction, a relatively thin layer of metallic compound other than the inverse current blocking film having a specific resistance greater than the specific resistance of either of said electrode elements interposed between said electrode elements and adapted to produce a material potential drop between said electrode elements, said layer of resistance material comprising a compound of the electropositive electrode element formed by the decomposition of water between said electrode elements while the latter are maintained under high pressure, and means for retaining said electrode elements in assembled relation under a pressure above the minimum required for maintenance of the rectifying film at the junction of said electrode elements and below the maximum at which one of said electrode elements may crush.

6. In dry surface-contact rectifying devices and the like, the combination comprising an electronegative electrode element of a sulphur compound with copper, an electropositive electrode element of a metal removed at least two groups in the electropositive direction in the electrochemical series from the chemical element sulphur, said electrodes being adjacently disposed for asymmetric conduction, a relatively thin layer other than the inverse current-blocking film of an oxycompound of said electropositive electrode element interposed between said electrode elements and adapted to produce a material potential drop between said electrode elements, said layer being formed by the decomposition of a film of water between said electrode elements while the latter are maintained under pressure close to the compression strength of the weaker element, and means for retaining said electrode elements in assembled relation under a pressure above the minimum required for the maintenance of the rectifying film at the junction of said electrode elements and below the maximum at which one of said electrode elements may crush.

7. The method of producing at the junction of an electropositive and electronegative electrode element for dry surface contact rectifying devices and the like, a permanent initial adhering layer other than the inverse current-blocking film of a material having a higher specific symmetric ohmic resistance than the resistance of either electrode of said device, which comprises applying high pressure to said elements and decomposing water at said junction while said pressure is maintained.

8. The method of producing dry surface-contact rectifying devices and the like, which comprises providing electropositive and electronegative elements of an electric couple having unilateral conductivity, electrically forming between the elements of said couple a permanent initial adhering contacting resistance layer other than the inverse current-blocking film comprising a compound of the electropositive element having higher specific symmetric ohmic resistance than either of said elements, and retaining said elements during at least the period of formation of said resistance layer with pressure sufficient to withstand the effects of the electrostatic forces generated at said surface and below the compression strength of the weaker of said elements.

9. The method of forming an asymmetric couple of the dry surface contact variety, which comprises disposing adjacently relatively electropositive and electronegative bodies, placing a thin film of water therebetween, applying to said elements pressure close to the compression strength of the weaker element, and then applying an alternating current at the normal operating potential to electrolytically decompose the water, and causing the formation of a resistance layer other than the inverse current-blocking film at the junction of said electropositive and electronegative bodies, whereby an inverse current-blocking film may be formed.

In testimony whereof I affix my signature.

SAMUEL RUBEN.

CERTIFICATE OF CORRECTION.

Patent No. 1,896,101.                                                           February 7, 1933.

SAMUEL RUBEN.

It is hereby certified that error appears in the printed specification of the above numbered patent requiring correction as follows: Page 2, line 69, strike out the words "a proper drop of potential is overcome" and insert instead "interposing between those materials"; and that the said Letters Patent should be read with this correction therein that the same may conform to the record of the case in the Patent Office.

Signed and sealed this 14th day of March, A. D. 1933.

M. J. Moore, (Seal)                                       Acting Commissioner of Patents.